United States Patent [19]

Cummings

[11] Patent Number: 4,940,489
[45] Date of Patent: Jul. 10, 1990

[54] MOLTEN METAL FILTRATION SYSTEM AND PROCESS

[75] Inventor: Michael A. Cummings, Taylors, S.C.

[73] Assignee: Alusuisse-Lonza Services Ltd., Zurich, Switzerland

[21] Appl. No.: 330,612

[22] Filed: Mar. 30, 1989

[51] Int. Cl.⁵ .................. C21C 7/00; B01D 35/02
[52] U.S. Cl. ........................... 75/407; 75/412; 266/227
[58] Field of Search ............... 75/45, 46, 61, 68 R, 75/93 R, 82; 266/227, 229; 210/510.1, 773; 164/134, 337, 437

[56] References Cited

U.S. PATENT DOCUMENTS

| | | | |
|---|---|---|---|
| 3,006,473 | 10/1961 | Gamber | 75/68 R |
| 4,007,923 | 2/1977 | Chia | 266/217 |
| 4,024,056 | 5/1977 | Yarwood et al. | 75/68 R |
| 4,087,080 | 5/1978 | Steinegger et al. | 266/88 |
| 4,092,153 | 5/1978 | Yarwood et al. | 210/69 |
| 4,277,281 | 7/1981 | Weber et al. | 75/93 R |
| 4,619,443 | 10/1986 | Mitchell | 266/220 |
| 4,640,497 | 2/1987 | Heamon | 266/227 |
| 4,667,939 | 5/1987 | Luyckx | 266/287 |

FOREIGN PATENT DOCUMENTS

| | | | |
|---|---|---|---|
| 26664 | 3/1981 | Japan | 164/477 |
| 2020818 | 1/1987 | Japan | 210/510.1 |

Primary Examiner—Melvyn J. Andrews
Attorney, Agent, or Firm—Bachman & LaPointe

[57] ABSTRACT

The present invention relates to an improved molten metal filtration system. The system comprises at least one filtration assembly positioned within a filter chamber intermediate a molten metal inlet and a molten metal outlet and a dam wall positioned intermediate each filtration assembly and each molten metal outlet. Each dam wall prevents the initial molten metal used to prime the filter(s) in each filtration assembly from proceeding directly to the outlet. Instead, the dam wall collects the initial molten metal and forms it into a pool of heated molten metal. This pool has been found to reduce the amount of heat loss during the filtration process. A process for using the filtration system of the present invention is also described.

11 Claims, 2 Drawing Sheets

MOLTEN METAL FILTRATION SYSTEM AND PROCESS

BACKGROUND OF THE INVENTION

The present invention relates to an improved molten metal filtration system having dam means for collecting a volume of molten metal sufficient to enable a reduction in the heat lost in the molten metal as it flows through the filtration system towards a casting nozzle and to thereby substantially prevent freezing problems in the molten metal being cast. The invention also relates to a process for using the system.

In practice, molten metal generally contains entrained solids which are deleterious to the final cast metal product. These entrained solids appear as inclusions in the final cast product after the molten metal is solidified. These inclusions adversely affect the physical properties as well as the aesthetic appearance of the final cast product.

A variety of different techniques are known for removing impurities from molten metal. U.S. Pat. No. 3,006,473 to Gamber illustrates one such system in which molten metal flows through a porous carbon filter plate in a filtering chamber. The system includes an overflow-type metal outlet which is constructed so that the molten metal is maintained at least above the top of the exposed portion of the filter plate.

In some systems, filtration of the molten metal takes place in a chamber having gas inlet device(s) for admitting a non-reactive gas. U.S. Pat. No. 4,087,080 to Steinegger et al. illustrates one such system. In the Steinegger et al. system, the melt flows into a filter chamber containing a loose bed of granulate and means for introducing gas into the melt. The melt flows downward through the filter chamber into a riser chamber, then upwards through the riser chamber, and finally out of the riser chamber.

In yet another system, the molten metal flows through a series of successively arranged purification stages including: (1) a deslagging stage wherein relatively large particulate impurities are removed from the molten metal by filtration through a woven refractory filter; (2) a fluxing stage for removing entrapped and dissolved hydrogen from the molten metal; (3) an adsorption stage; and (4) a final filtration stage wherein finer particulate impurities are removed by a rigid, porous refractory filter medium. U.S. Pat. No. 4,007,923 to Chia illustrates such a system.

Porous ceramic foam materials are known to be particularly useful in filtering molten metal. U.S. Pat. Nos. 4,024,056 to Yarwood et al., 4,092,153 to Yarwood et al., 4,277,281 to Weber et al., and 4,640,497 to Heamon illustrate various filtration systems employing ceramic foam filter materials. Ceramic foam materials are particularly useful for filtering molten metal for a variety of reasons included among which are their excellent filtration efficiency, low cost, ease of use and disposability.

Barriers have been used in intermediate pouring vessels such as tundishes to assist in the separation of non-metallic inclusions from the molten metal passing through the tundish. They also have been used to assist in the escape of entrained gasses from the molten metal. U.S. Pat. No. 4,619,443 to Mitchell illustrates one such dam barrier. The dam has passages in its upper surface for discharging gas into the melt. It is intended to improve the circulation of the molten metal in the tundish so as to substantially eliminate dead spaces.

As shown in the aforementioned Heamon patent, filtration systems have been employed in the tundish of a continuous caster. The filter(s) of the system separate the tundish into one or more compartments. The incoming metal passes through the filter(s) prior to being teemed through the tundish nozzle. During the filter priming process, a certain amount of heat in the metal is lost to the filtration system. The heat loss encountered during this phase can be particularly great. FIG. 1 is a graph depicting typical temperature losses over time for molten stainless steel alloy passing through a tundish having a center compartment for receiving the molten metal and two outlet compartments separated from the central compartment by a 38 mm thick, #10 zirconia-alumina filter. The heat losses were measured using a thermocouple type temperature probes. As can be seen from the Figure, temperature losses occur on both sides of the filter assemblies with the initial temperature losses for the molten metal being filtered quite significant.

It has been found that at normal operating metal temperatures, heat losses can be sustained which are sufficient enough in some cases to cause the filtered metal to freeze in the nozzle of a post-filtration compartment and halt the cast. In many instances, the overall heat loss as measured by a temperature probe would indicate there is sufficient heat in the system to cast; however, the metal in the nozzle has in reality been chilled enough to freeze and prevent the cast.

Accordingly, it is an object of the present invention to provide an improved filtration system which reduces the heat losses sustained during the filtering process.

It is a further object of the present invention to provide an improved filtration system as above having utility in a continuous casting system.

It is still a further object of the present invention to provide an improved filtration system as above having utility in the casting of ferrous metal and metal alloys.

These and other objects and advantages will become more apparent from the following description and drawings in which like reference numerals depict like elements.

SUMMARY OF THE INVENTION

The foregoing objects and advantages are achieved by the filtration system of the present invention which comprises a filter chamber having at least one molten metal inlet, at least one molten metal outlet, and at least one filter assembly mounted therein. Each filter assembly comprises a porous filter membrane, preferably a ceramic foam filter, seated in a solid plate-like member. To reduce the heat loss in the molten metal as it passes through the filter, a barrier or dam is placed immediately downstream of the filter assembly. The dam prevents the initial metal used to prime the filter from proceeding directly to the nozzle. Instead, it collects the initial molten metal into a pool which greatly reduces the cooling effect caused by the filtration process by providing heated metal on both sides of the filter assembly. A process for using the system is also described herein.

DETAILED DESCRIPTION OF THE INVENTION

As previously discussed, the present invention relates to an improved filtration system for use in continuous or non-continuous casting systems. While the invention will be described in the context of a tundish filtration system, it should be appreciated that the present invention has applicability in other types of molten metal filtration systems. Similarly, while the invention has particular utility in the filtration of ferrous metals and metal alloys, it can also be used in the filtration of other metals and metal alloys such as nickel- and aluminum-base metals and metal alloys.

Figure 1:
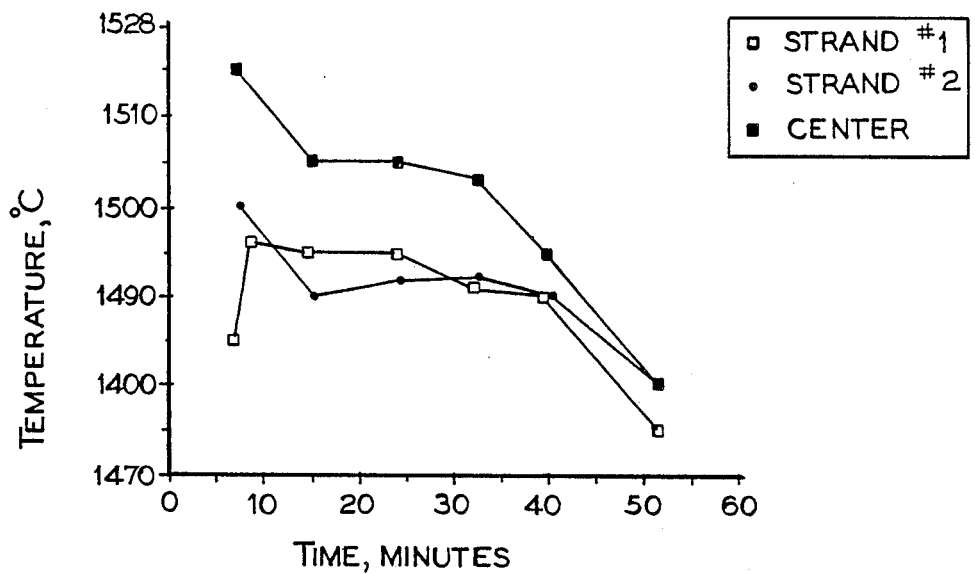
FIG. 1 is a graph depicting typical temperature loss over time from the inlet of a filtration system to the outlet(s)
Figure 2:
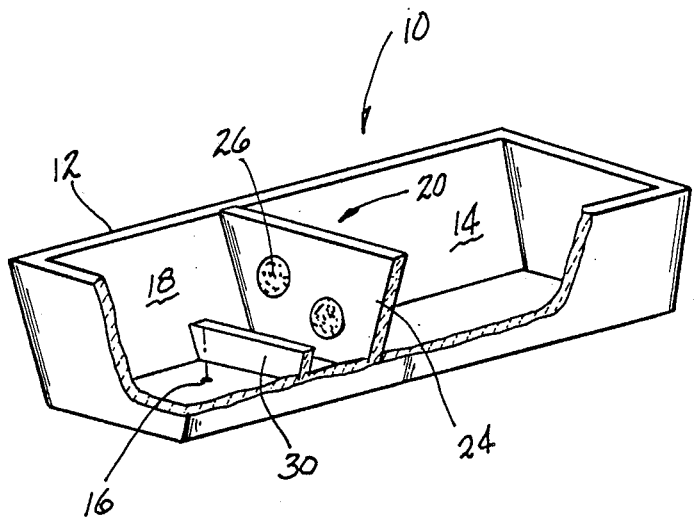
FIG. 2 is a schematic representation, partially broken away, of a first tundish filtration system embodiment in accordance with the present invention.
Figure 3:
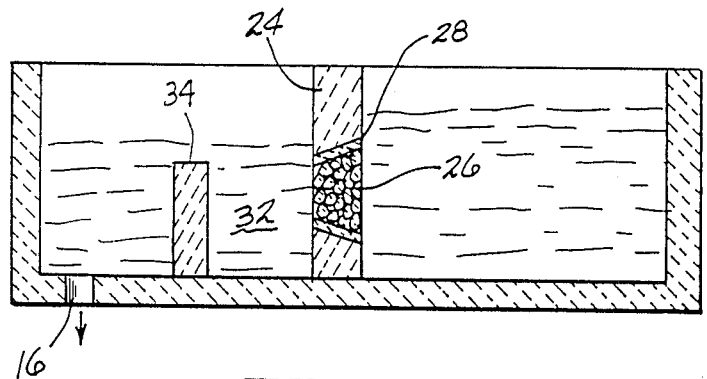
FIG. 3 is a cross sectional view of the embodiment of FIG. 2 taken along line A—A.

Referring now to the drawings, there is illustrated in FIG. 2 a tundish 10 into which molten metal is poured, usually from a ladle not shown. The tundish 10 defines a filter chamber and may have an outer steel shell not shown, an insulated core not shown and a metal resistant lining 12, as for example, a ceramic lining.

Alternatively, the tundish 10 may be constructed entirely out of a ceramic material.

The tundish 10 may be open at the top. Molten metal can be poured into an inlet compartment 14 through the open top. If desired, the tundish could have a cover not shown with an opening through which the molten metal can be poured. The tundish 10 has one or more outlets 16 located in an outlet compartment 18 through which filtered molten metal may pass to a casting nozzle not shown. A metal flow path is defined by the molten metal inlet(s) and the outlet(s) 16.

At least one filter assembly 20 is mounted in the tundish 10 between the molten metal inlet and each molten metal outlet 16. Each filter assembly 20 includes a plate-like solid member 24 formed from a material, such as a ceramic, e.g. chrome-alumina, mullite, etc., which is resistant to the molten metal being filtered and which is resistant to thermal shock, erosion and corrosion and at least one porous filter member 26 seated in the solid member 24 permitting flow of molten metal therethrough. Each porous filtration member 26 may comprise a ceramic foam filter prepared in accordance with the teachings of U.S. Pat. No. 3,962,081, which is incorporated by reference herein, or any other suitable filter. The '081 patent describes a ceramic foam filter prepared by impregnating a polyurethane foam with a ceramic slurry and firing the impregnated material to form a ceramic foam material in the configuration of the original polyurethane foam.

The porous filter member 26 is seated in the solid member with a gasket material 28 between the periphery of the porous member 26 and the solid member 24 so as to tightly seat the porous member in the solid member. The gasket material can be any of the known high temperature, low density compressible ceramic fiber materials or other known gasket materials. If desired, the gasket 28 may be omitted. In such a situation, each filter member may be cemented in place using an apropriate cement or adhesive material. As shown in the drawings, the filter member(s) 26 may comprise two round filter members in each plate-like member with each round member having a bevelled peripheral edge mating in a like bevelled peripheral edge of the solid member.

The filter assemblies 20 may be installed in the tundish 10 in any desired manner. Generally, each assembly 20 would be removable so as to facilitate filter replacement. As shown in FIG. 2, the filter assembly 20 divides the tundish 10 into the inlet compartment 14 and the outlet compartment 18.

It has been found that heat in the metal is lost to the filtration system. This heat loss is particularly great during the priming process. In some cases, the heat loss is sufficiently high that the filtered metal will freeze in the nozzle of a post-filtration compartment not shown preventing a cast.

To deal with this problem, the filtration system of the present invention has a barrier or dam wall 30 positioned immediately downstream of the filter assembly 20. The barrier 30 serves several purposes. First, it collects the initial molten used to prime the porous filter members 26 and forms it into a pool 32 of heated molten metal. As additional molten metal flows through the filter members 26, the molten metal in the pool is reheated. This heated molten metal pool assists the priming process and helps reduce molten metal heat loss during filtration. This is due in large part to the presence of hot molten metal on both sides of the filter assembly. A still further advantage to the filtration system of the present invention is that the molten metal passing through the system travels at a higher flow rate because of the reduced heat loss. As a result, the metal is less likely to freeze in the casting nozzle. It can be said that molten metal flowing through the improved filtration system of the present invention is better able to retain heat.

The dam 30 also serves to create a desirable upward flow of molten metal. Any inclusions remaining in the molten metal passing through the filter members are formed into a thin surface layer as a result of this upward movement.

It has been found that to achieve the foregoing benefits the dam wall 30 must be positioned and designed to collect a specific volume of metal. This volume of metal must be sufficient to raise and/or maintain the temperature of the molten metal pool to or at a temperature which promotes casting. More particularly, the dam wall 30 should be positioned and designed to capture a molten metal volume which is at least about 3 times, preferably greater than 3 times, the total filter volume of the filtration assembly 20. The total volume may be defined as the sum of the volume of each filter 26 in the filter assembly.

While the dam wall 30 may have any desired height, it is preferred that the top 34 of the wall be approximately at the same level as the uppermost edge of the porous filter member(s) 26. Of course, once the height of the dam wall is determined, its location downstream of the filtration assembly can be determined. Alternatively, one could position the dam wall first at a desired downstream location and then determine the height needed to collect the desired volume of molten metal.

The dam wall 30 may be formed from any suitable molten metal resistant material. Preferably, it too is formed from a ceramic material such as a chromia-alumina composition, a zirconia-alumina composition or mullite. The material selected for the dam wall 30 should also be resistant to thermal shock, erosion and corrosion.

In operation, molten metal is poured into the tundish 10. An initial flow of molten metal is used to prime the filter(s) 26. This initial flow is prevented from proceeding to the outlet 16 by the dam wall 30. Instead, it collects in the space between the filter assembly 20 and the dam wall 30 and forms a pool 32 of heated molten metal. As more molten metal flows through the filter(s) 26, the additional molten metal is caused to move upwardly by the dam wall 30. The additional molten metal also serves to raise the temperature of the collected molten metal and maintain it at a useful reheat temperature. As a result of the presence of heated metal on both sides of the filter assembly 20, the metal heat loss during the filtration process is substantially reduced which in turn reduces the likelihood of metal freezing as the filtered molten metal proceeds to the casting nozzle.

The filter assembly of the present invention may be used in a wide variety of continuous or non-continuous casting systems. For example, it can be used in either horizontal or vertical casting systems. Of course, in a horizontal casting system, the tundish 10 may have a molten metal inlet in a sidewall of the compartment 14 and a molten metal outlet in a sidewall of the compartment 18.

The filtration system of the present invention is believed to have particular utility in high temperature, T 2800° F., applications. This is because such systems have a greater molten heat loss problem which must be overcome.

Figure 4:
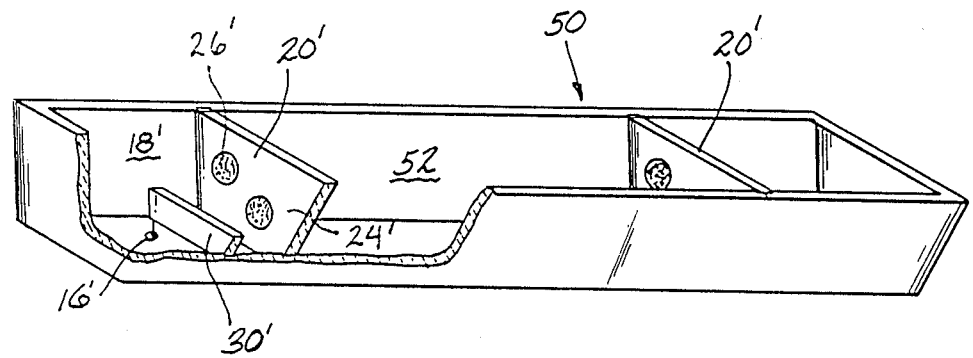
FIG. 4 is a schematic representation, partially broken away, of a second tundish embodiment having a dual filtration system in accordance with the present invention.
Figure 5:
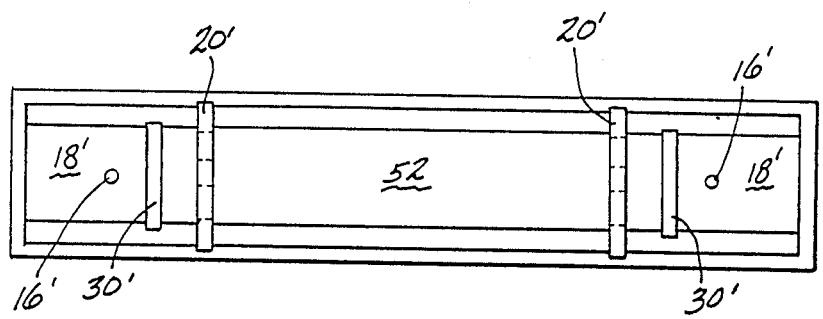
FIG. 5 is a top view of the tundish of FIG. 4.

FIGS. 4 and 5 illustrate the use of the present invention in a tundish 50 having a central compartment 52 for receiving molten metal from a source such as a ladle not shown and two outlet compartments 18', each having a molten metal outlet 16'. A filter assembly 20' separates each outlet compartment 18' from the central compartment 52. As before, each filter assembly comprises a solid wall member 24' having one or more porous filter members 26' positioned therein. A dam wall 30' in accordance with the considerations outlined hereinbefore is located between each filter assembly 20' and each molten metal outlet 16' to prevent the initial metal used to prime the filter(s) 26' from proceeding directly to the outlet 16' and to form the desired heated molten metal pool.

While it is not necessary to do so, the tundishes 10 and 50 could be preheated if desired. Preheating may be used to further assist in reducing temperature loss in the metal and thermal shock in the filter and to facilitate priming of the filter. In the past, it has been found that preheating by itself is not enough to avoid the problems discussed herein. Any suitable means known in the art may be used to preheat the tundishes.

It is apparent that there has been provided in accordance with this invention a molten metal filtration system and process which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An improved molten metal filtration system comprising:
   a filter chamber having a molten metal inlet and a molten metal outlet defining a molten metal flow path therebetween;
   a filter assembly disposed between said inlet and said outlet;
   said filter assembly including at least one porous ceramic foam filter member seated in a solid plate-like member;
   means for preventing molten metal used to initially prime said at least one filter member in said filter assembly from proceeding directly to said outlet and for collecting said priming molten metal so as to form a pool of heated molten metal downstream of said filter assembly for reducing the cooling effect caused by passage of said molten metal through said at least one filter member; and
   said preventing means being positioned intermediate said filter assembly and said molten metal outlet.

2. A molten metal filtration system according to claim 1 wherein said preventing means comprises a dam positioned a desired distance downstream of said filter assembly and said dam has a height sufficient to collect a volume of molten metal sufficient to prevent significant metal heat loss during passage of the molten metal through said filter assembly.

3. A molten metal filtration system according to claim 2 wherein:
   each said porous filter member has a volume and said filter assembly has a total volume defined by the sum of the volumes of each porous filter member in said filter assembly; and
   said dam collects a molten metal volume which is at least 3 times the total volume of said filter assembly.

4. A molten metal filtration system according to claim 2 wherein said dam is formed by a solid wall having a height at substantially the same level as an uppermost edge of said at least one filter member in said filter assembly.

5. A molten metal filtration system according to claim 4 wherein said dam wall is formed from a ceramic material.

6. A molten metal filtration system according to claim 1 wherein said solid plate-like member is formed from a ceramic material.

7. A molten metal filtration system according to claim 1 which further comprises:
   said filter chamber being defined by a tundish having a central molten metal inlet and two molten metal outlets at opposed ends of said tundish;
   a filter assembly between said central inlet and each said molten metal outlet; and
   said preventing means comprises dam means between each said filter assembly and each said outlet.

8. A molten metal filtration system according to claim 1 wherein each said filter member has a round configuration and a bevelled edge for mating with a bevelled edge in said solid plate-like member.

9. A process for filtering molten metal which comprises:
   providing a filter chamber having a molten metal inlet and a molten metal outlet defining a molten metal flow path therebetween;
   placing a filter assembly having at least one porous ceramic foam filter member seated in a solid plate-like member intermediate said inlet and said outlet;

priming said at least one porous filter member with an initial flow of molten metal; and
preventing said initial flow of molten metal from proceeding directly to said outlet, said preventing step including collecting said initial molten metal into a pool of heated molten metal downstream of said filter assembly for reducing heat losses caused during passage of said molten metal through said at least one filter member.

10. A process in accordance with claim 9 wherein said preventing step comprises positioning a dam wall intermediate said filter assembly and said outlet for collecting a desired volume of molten metal including said initial molten metal downstream of said filter assembly.

11. A process according to claim 10 wherein each said filter member has a volume and said filter assembly has a total volume which is the sum of the filter member volumes and said collecting step comprises collecting a molten metal volume which is at least about 3 times the total volume of said filter assembly.

* * * * *